(12) United States Patent
Robbins

(10) Patent No.: US 9,905,038 B2
(45) Date of Patent: Feb. 27, 2018

(54) CUSTOMIZABLE STATE MACHINE FOR VISUAL EFFECT INSERTION

(71) Applicant: Nvidia Corporation, Santa Clara, CA (US)

(72) Inventor: Jonathan Robbins, Durham, NC (US)

(73) Assignee: Nvidia Corporation, Santa Clara, CA (US)

( * ) Notice: Subject to any disclaimer, the term of this patent is extended or adjusted under 35 U.S.C. 154(b) by 0 days.

(21) Appl. No.: 15/043,887

(22) Filed: Feb. 15, 2016

(65) Prior Publication Data

US 2017/0236321 A1    Aug. 17, 2017

(51) Int. Cl.
  *G06T 1/20*   (2006.01)
  *G06T 15/00*  (2011.01)
  *G06T 15/50*  (2011.01)

(52) U.S. Cl.
  CPC .............. *G06T 15/005* (2013.01); *G06T 1/20* (2013.01); *G06T 15/503* (2013.01); *G06T 2207/20208* (2013.01)

(58) Field of Classification Search
  None
  See application file for complete search history.

(56) References Cited

U.S. PATENT DOCUMENTS

2014/0149528 A1\*  5/2014  VandaVaart ....... H04L 29/08072
                                                                  709/213

OTHER PUBLICATIONS

Kim, B., et al., "DX9&10 Driver-Side Ambient Occlusion," NVIDIA Corporation, Apr. 2009, 21 pages.

\* cited by examiner

*Primary Examiner* — Kee M Tung
*Assistant Examiner* — Yanna Wu

(57) ABSTRACT

A computing system, driver and method for inserting an extra visual effect into a rendering pipeline of an application are provided. In one embodiment, the method includes: 1) loading into a driver a state machine that is customized for a particular application being rendered at a rendering pipeline; 2) identifying a point in the rendering pipeline to insert an extra visual effect using the state machine; and 3) inserting the extra visual effect into the rendering pipeline at the point.

20 Claims, 2 Drawing Sheets

CUSTOMIZABLE STATE MACHINE FOR VISUAL EFFECT INSERTION

TECHNICAL FIELD

This application is directed, in general, to inserting a visual effect and, more specifically, to inserting a visual effect into a rendering pipeline using a driver.

BACKGROUND

One of the features of a Graphics Processing Unit (GPU) driver, such as DirectX® driver from Microsoft® of Redmond, Wash., is inserting, into a rendering pipeline of an application, an extra visual effect that is not built into the application. Identifying a correct point or points in the rendering pipeline of the application to insert the extra visual effect is complex because it requires identifying subtle distinctions between application states and behaviors during rendering.

The current approach to identify the correct point or points in the rendering pipeline uses fixed sets of states and conditions of a GPU driver. Rendering states of the application are mapped to the fixed set of states of the driver for performing the required computations, and the transitions between the states are identified using the fixed set of conditions as the insertion point of the visual effect.

But as application rendering engines have become more complex, shortcomings to the current approach have manifested. First, as states of a rendering pipeline of an application do not match well with the fixed states of a GPU driver, this often results in the visual effect being inserted too soon or too late in the rendering pipeline. Second, the fixed set of conditions of a GPU driver is often not enough for a more complex, new application, and modifying the GPU driver to support the new application requires a substantial investment of engineering time and cost.

In view of the above shortcomings, a new and better approach to insert visual effects into an application rendering pipeline is desired.

SUMMARY

One aspect provides a method for using a GPU driver to insert an extra visual effect into a rendering pipeline of an application. In one embodiment, the method includes: 1) loading into a GPU driver a state machine that is customized for an application being rendered at a rendering pipeline; 2) identifying a point in the rendering pipeline to insert an extra visual effect using the loaded state machine; and 3) inserting the extra visual effect into the rendering pipeline at the identified point.

Another aspect provides a GPU driver for inserting an extra visual effect into a rendering pipeline of an application. In one embodiment, the GPU driver includes: 1) a state machine loader configured to load into the GPU driver a state machine that is customized for an application being rendered at a rendering pipeline; 2) an insertion point identifier configured to identify a point in the rendering pipeline to insert an extra visual effect using the loaded state machine; and 3) an extra visual effect inserter configured to insert the extra visual effect into the rendering pipeline at the identified point.

Yet another aspect provides a computing system for inserting an extra visual effect into a rendering pipeline of an application. In one embodiment, the computing system includes: 1) a GPU including a processor and a rendering pipeline and 2) a driver that causes, when installed on said computing system, the processor to: A) load a state machine that is customized for an application being rendered at the rendering pipeline; B) identify a point in the rendering pipeline to insert an extra visual effect using the loaded state machine; and C) insert the extra visual effect into the rendering pipeline at the identified point.

BRIEF DESCRIPTION

Reference is now made to the following descriptions taken in conjunction with the accompanying drawings, in which.

DETAILED DESCRIPTION

Introduced herein is new insertion logic that closely matches the stages and conditions of an application and is easily modifiable. Instead of a GPU driver having fixed sets of states and conditions, the new insertion logic allows a GPU driver to use a state machine that is customizable for each application. This allows a closer monitoring of subtle behaviors of each application so that more robust visual effect insertion can be realized. The term "extra visual effect" in this disclosure does not refer to a graphical content or visual effect that is built into the particular application. The term refers to an additional graphical content and/or post-processing effect that is inserted by the GPU driver. Some of the examples of the "extra visual effect" include an added heads-up display in a video game, and/or horizon-based ambient occlusion, anti-aliasing, tone mapping, and HDR mapping.

In one embodiment, a state machine that is customized for the application that is being rendered in the rendering pipeline is loaded into the driver. The state machine is encoded in a separate file from the driver. Each state will contain sets of rules that allow the driver to detect conditions that cause a transition between natural states of the rendering application and to perform computations that are required to insert the extra visual effect at the transition. The term "natural state" in this disclosure refers to an innate state of an application that are not mapped or associated with fixed states of a driver used in the aforementioned current approach.

As the loaded state machine is customized specifically for the application being rendered, the driver would be able to use the natural states of the rendering application to insert the extra visual effect. As such, the visual effect insertion disclosed herein will be available in cases where mapping the application's behavior onto a set of fixed states were impossible or only made possible by adding expensive exceptions to the fixed state framework of the current approach. Moreover, as different state machines can be loaded for different applications, the driver modification and recompiling needed to support new applications or application states become much less frequent.

Before describing various embodiments of the novel method and mechanism, a computing system within which the mechanism may be embodied or the method carried out will be described.

Figure 1:
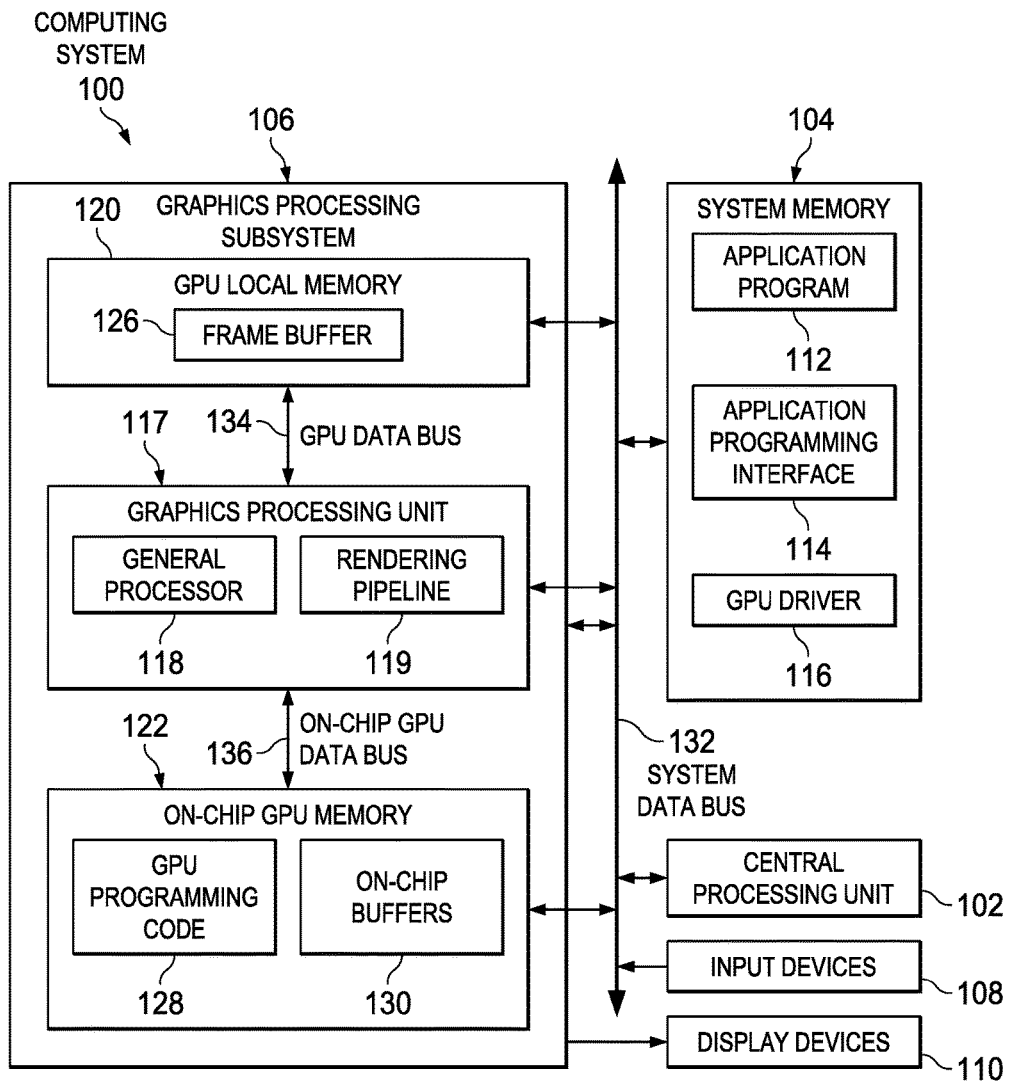
FIG. 1 is a block diagram of one embodiment of a computing system in which one or more aspects of the invention may be implemented.

FIG. 1 is a block diagram of one embodiment of a computing system 100 in which one or more aspects of the invention may be implemented. The computing system 100 includes a system data bus 132, a central CPU 102, input devices 108, a system memory 104, a graphics processing subsystem 106 including a graphics processing unit (GPU) 117, and display devices 110.

As shown, the system data bus 132 connects the CPU 102, the input devices 108, the system memory 104, and the graphics processing subsystem 106. The CPU 102 receives user input from the input devices 108, executes programming instructions stored in the system memory 104, operates on data stored in the system memory 104, sends instructions and/or data (i.e., work or tasks to complete) to the GPU 117 to complete and configures needed portions of the graphics processing system 106 for the GPU 117 to complete the work. The system memory 104 typically includes dynamic random access memory (DRAM) used to store programming instructions and data for processing by the CPU 102 and the graphics processing subsystem 106. The GPU 117 receives the transmitted work from the CPU 102 and processes the work. In the illustrated embodiment, the GPU 117 completes the work in order to render and display graphics images on the display devices 110. A rendering pipeline 119 of the GPU 117 is employed for processing the work.

As also shown, the system memory 104 includes an application program 112, an application programming interface (API) 114, and a GPU driver 116. The application program 112 generates calls to the API 114 in order to produce a desired set of results, typically in the form of a sequence of graphics images.

The graphics processing subsystem 106 includes the GPU 117, an on-chip GPU memory 122, an on-chip GPU data bus 136, a GPU local memory 120, and a GPU data bus 134. The GPU 117 is configured to communicate with the on-chip GPU memory 122 via the on-chip GPU data bus 136 and with the GPU local memory 120 via the GPU data bus 134. As noted above, the GPU 117 can receive instructions from the CPU 102, process the instructions in order to render graphics data and images, and store these images in the GPU local memory 120. Subsequently, the GPU 117 may display certain graphics images stored in the GPU local memory 120 on the display devices 110.

The GPU 117 includes a processor 118 and the graphics pipeline 119. The processor 118 is a general purpose processor configured to assist in operating the GPU 117. The processor 118 can include multiple processing grids that can be programmed for specific functions.

The graphics/rendering pipeline 119 includes fixed function stages and programmable shader stages. The fixed function stages can be typical hardware stages included in a fixed function pipeline of a GPU. The programmable shader stages can be streaming multiprocessors. Each of the streaming multiprocessors is capable of executing a relatively large number of threads concurrently. Advantageously, each of the streaming multiprocessors can be programmed to execute processing tasks relating to a wide variety of applications, including but not limited to linear and nonlinear data transforms, filtering of video and/or audio data, modeling operations (e.g., applying of physics to determine position, velocity, and other attributes of objects), and so on.

The GPU 117 may be provided with any amount of on-chip GPU memory 122 and GPU local memory 120, including none, and may use on-chip GPU memory 122, GPU local memory 120, and system memory 104 in any combination for memory operations. The CPU 102 can allocate portions of these memories for the GPU 117 to execute work.

The on-chip GPU memory 122 is configured to include GPU programming code 128 and on-chip buffers 130. The GPU programming 128 may be transmitted from the GPU driver 116 to the on-chip GPU memory 122 via the system data bus 132.

The GPU local memory 120 typically includes less expensive off-chip dynamic random access memory (DRAM) and is also used to store data and programming used by the GPU 117. As shown, the GPU local memory 120 includes a frame buffer 126. The frame buffer 126 stores data for at least one two-dimensional surface that may be used to drive the display devices 110.

The display devices 110 are one or more output devices capable of emitting a visual image corresponding to an input data signal. For example, a display device may be built using a cathode ray tube (CRT) monitor, a liquid crystal display, or any other suitable display system.

Having described a computing system within which the circuit and method for inserting an extra visual effect into a graphics/rendering pipeline may be embodied or carried out, various embodiments of the circuit and method will be described.

Figure 2:
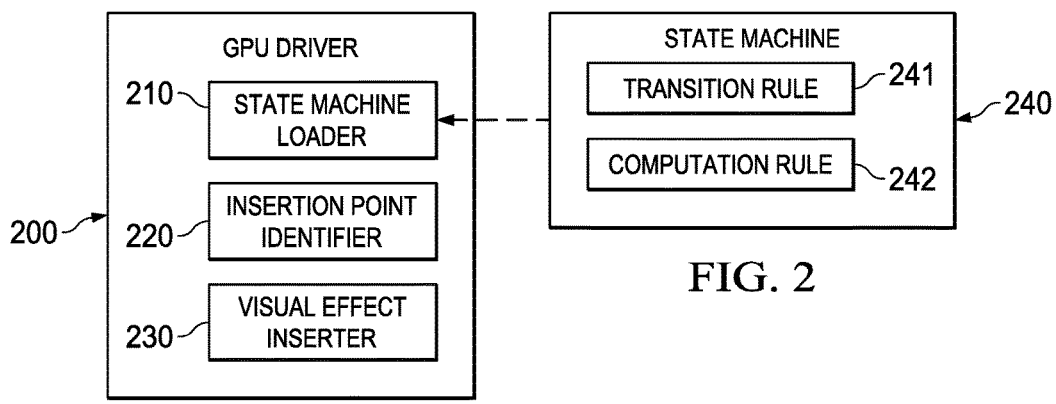
FIG. 2 is a block diagram of an embodiment of a GPU driver that inserts an extra visual effect into a rendering pipeline of an application according to the principles of the disclosure.

FIG. 2 illustrates a block diagram of an embodiment of a GPU driver 200 that inserts an extra visual effect into a rendering pipeline of a particular application that is being rendered in a rendering pipeline. In the illustrated embodiment, the GPU driver 200 includes a state machine loader 210, an insertion point identifier 220, and a visual effect inserter 230. The GPU driver 200 supports graphics rendering application programming interfaces (APIs), such as DirectX®.

The state machine loader 210 is configured to load into the GPU driver 200 a state machine 240 that is customized for the particular application being rendered in the rendering pipeline. The state machine 240 may be one of many state machines that are stored in a state machine repository. The state machine repository may be located in a system memory such as the system memory 104 in FIG. 1 or in a non-volatile memory such as a hard disk, with only the state machine for the active application loaded into a system memory. In one embodiment, the state machine repository may be a part of a driver, such as the GPU driver 200, and loading of a state machine may be carried out internally within the driver.

In one embodiment, the state machine 240 is embodied as a text file. In another embodiment, the state machine 240 is embodied as an Extensible Markup Language (XML) file. In certain embodiments, the state machine 240 is encoded with a bitcode representation.

The insertion point identifier 220 is configured to identify a point in the rendering pipeline of the particular application to insert the extra visual effect using the loaded state machine 240. In one embodiment, the insertion point, i.e. the point identified by the insertion point identifier 220, is a transition between natural states of the particular application, and the transition is detected using a transition rule 241 of the loaded state machine 240.

The visual effect inserter 230 is configured to insert the extra visual effect into the rendering pipeline at the insertion point. In one embodiment, the visual effect inserter 230 uses a computation rule 242 of the loaded state machine 240 to perform a computation that is required to insert the extra visual effect into the rendering pipeline at the insertion point.

As mentioned above, the state machine 240 includes at least one transition rule 241 and at least one computation rule 242. The transition rule 241 is a rule that is customized for detecting a transition between natural states of the particular application being rendered in the rendering pipeline. The transition rule 241 includes a set of conditions that causes the transition between natural states of the particular application.

Similar to the transition rule 241, the computation rule 242 is customized for performing a computation that is required to insert the extra visual effect at the insertion point in the rendering pipeline of the particular application. The computation rule 242 triggers a set of computations that needs to be performed to insert the extra visual effect at the insertion point in the rendering pipeline of the particular application.

In certain embodiments, a state machine such as 240 may be customized to insert more than one extra visual effect into a rendering pipeline of a particular application. In those embodiments, the state machine may include multiple sets of transition and computation rules.

Figure 3:
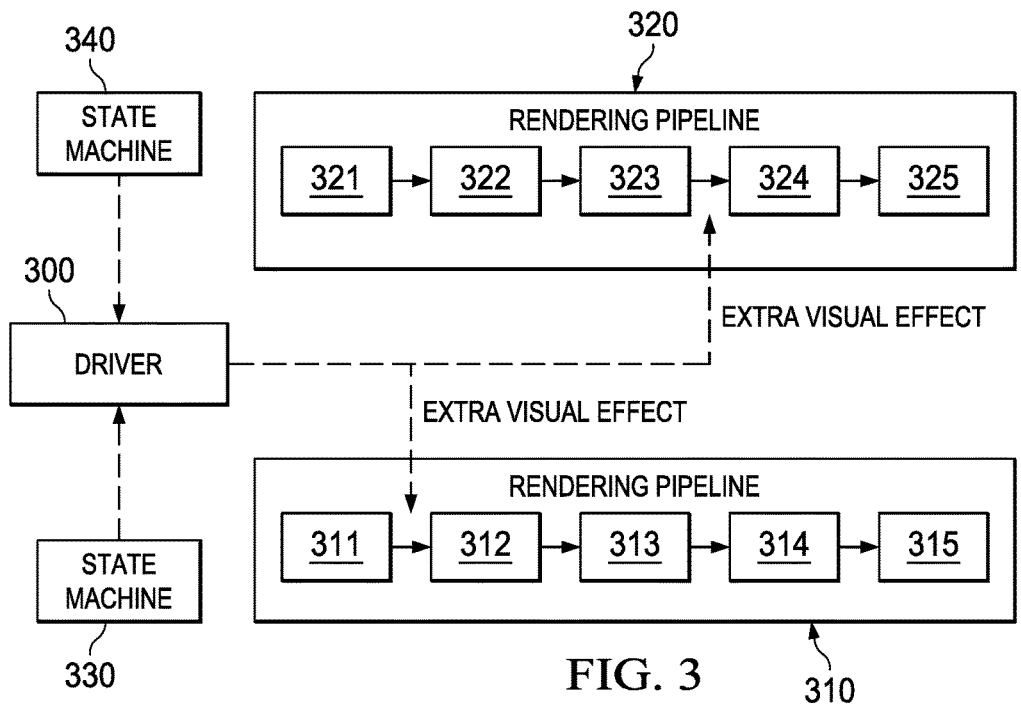
FIG. 3 is an illustration of an embodiment of a GPU driver inserting an extra visual effect into a rendering pipeline of an application according to the principles of the disclosure.

FIG. 3 illustrates an embodiment of a driver 300, e.g., GPU driver 200 in FIG. 2, inserting an extra visual effect into a rendering pipeline of an application. Rendering pipelines 310, 320 may be two different pipelines or a same pipeline in two different instances of the driver-side visual effect insertion.

In the illustrated embodiment, the rendering pipeline 310 is rendering the application A and the rendering pipeline 320 is rendering the application B. The applications A and B are two different applications exhibiting different natural states and behaviors. As such, a state machine A 330, which is particularly customized for the application A, is loaded for the rendering pipeline 310 and the state machine B, which is particularly customized for the application B, is loaded for the rendering pipeline 320. Each of the state machines A 330 and B 340 has at least one transition rule and at least one computation rule that is customized for inserting a particular extra visual effect into the rendering pipeline of the respective application.

In the rendering pipeline 310 of the application A, using the transition rule of the state machine A 330, the driver identifies a transition between natural states 311 and 312 as a point to insert the extra visual effect. The transition is detected using the transition-causing conditions of the transition rule of state machine A 330.

Once the insertion point is identified, the driver performs necessary computations to insert the extra visual effect at the insertion point using the computation rule of the state machine A 330. The necessary computations are triggered by the computation rule of state machine A 330. As a result, the extra visual effect is inserted at the transition between natural states 311 and 312 of the application A in the rendering pipeline 310.

For the rendering pipeline of the application B 320, a similar process is carried out. But instead of the state machine A 330, the driver 300 uses the state machine B 340 and its transition and computation rules to identify the insertion point and insert the extra visual effect thereat. In the illustrated embodiment, a transition between natural states 323 and 324 is identified as the insertion point and the extra visual effect is inserted there.

The driver 300 in the illustrated embodiment is able to directly follow natural states of the rendering pipelines 310 and 320 due to the customized rules of the state machines A 330 and B 340. As such, more subtle application behaviors are captured, and the visual effect insertion is more robust in the illustrated embodiment than the current approach. Moreover, the visual effect insertion becomes more straightforward in cases that were previously impossible or only made possible by adding expensive exceptions to the fixed state framework of the current approach.

Figure 4:
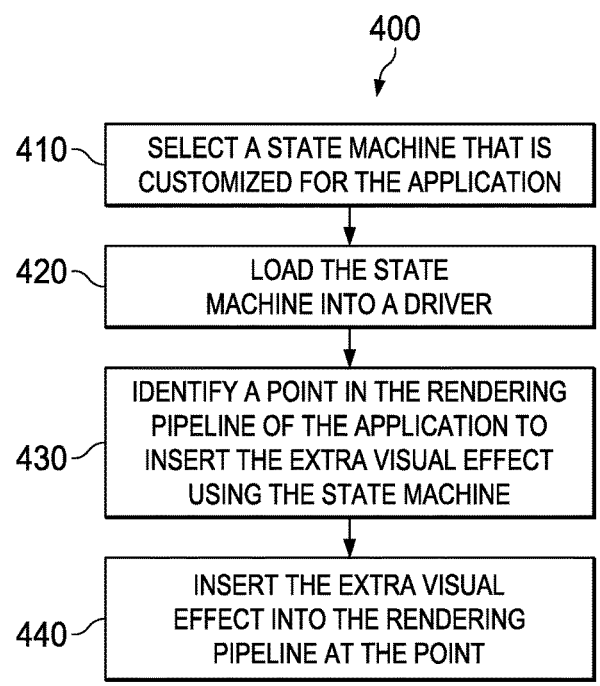
FIG. 4 is a flow diagram of one embodiment of a method for using a GPU driver to insert an extra visual effect into a rendering pipeline of an application carried out according to the principles of the disclosure.

FIG. 4 is a flow diagram of one embodiment of a method 400, carried out according to the principles of the disclosure, for using a driver to insert an extra visual effect into a rendering pipeline of a particular application. The driver can be the GPU driver 200 or an API driver. In one embodiment, the GPU driver supports graphics rendering APIs such as DirectX.

In a step 410, a state machine that is customized for the particular application is selected. In addition to the particularity of the application being rendered, the selection may also be based on the particular extra visual effect that is being inserted. As defined above, the term "extra visual effect" in this disclosure does not refer to a graphical content or visual effect that is built into a particular application but to an additional graphical content and/or post-processing effect that is inserted by the GPU driver. In certain embodiments, more than one extra visual effect may be inserted into the rendering pipeline, and the selected state machine may be one of many state machines that are stored in a state machine repository coupled to the GPU driver.

In a step 420, the selected state machine is loaded into the GPU driver. The state machine is encoded in a separate file from the driver. As the state machine is separate from the GPU driver, it can be updated and released to support new applications and new states in existing applications without having to update the driver. In certain embodiments, the state machine may still be a part of the driver.

In one embodiment, the state machine is embodied as a text or encrypted XML file. The text or encrypted XML file may be a binary file. In certain embodiments, the state machine is encoded with a bitcode representation.

In a step 430, the GPU driver identifies a point in the rendering pipeline of the application to insert the extra visual effect using the loaded state machine. In the illustrated embodiment, the insertion point is a transition between natural states of the application, where GPU activities such as draw and dispatch calls are triggered, in the rendering pipeline. The transition is detected using a transition rule of the loaded state machine, which is customized to detect conditions causing the transition. In one embodiment, more than one insertion point may be identified.

In a step 440, the GPU driver inserts the extra visual effect into the rendering pipeline at the insertion point. In the step 440, the GPU driver performs a computation that is required to insert the extra visual effect at the insertion point using a computation rule of the loaded state machine. The computation rule is customized to trigger computations that are required to insert the extra visual affect at the insertion point, i.e. a specific transition.

While the method disclosed herein has been described and shown with reference to particular steps performed in a particular order, it will be understood that these steps may be combined, subdivided, or reordered to form an equivalent method without departing from the teachings of the present disclosure. Accordingly, unless specifically indicated herein, the order or the grouping of the steps is not a limitation of the present disclosure.

The above-described computing systems, drivers and methods or at least a portion thereof may be embodied in or performed by various processors, such as conventional, digital data processors or computers, wherein the computers are programmed or store executable programs of sequences of software instructions to perform one or more of the steps of the methods, e.g., steps of the method of FIG. 4. The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, e.g., one or more of the steps of the method of FIG. 4, or functions of the computing systems and drivers described herein.

Certain embodiments of the invention further relate to computer storage products with a non-transitory computer-readable medium that have program code thereon for performing various computer-implemented operations that embody the apparatuses, the systems or carry out the steps of the methods set forth herein. Non-transitory medium used herein refers to all computer-readable media except for transitory, propagating signals. Examples of non-transitory computer-readable medium include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter.

Those skilled in the art to which this disclosure relates will appreciate that other and further additions, deletions, substitutions and modifications may be made to the described embodiments.

What is claimed is:

1. A method to insert an extra visual effect into a rendering pipeline of an application using a Graphics Processing Unit (GPU) driver, comprising:
   loading into said GPU driver a state machine that is customized for said application;
   identifying a point in said rendering pipeline to insert said extra visual effect using said state machine; and
   inserting said extra visual effect into said rendering pipeline at said point.

2. The method as recited in claim 1, wherein said state machine includes a transition rule that detects a condition that causes a transition between natural states of said application in said rendering pipeline.

3. The method as recited in claim 1, wherein said state machine includes a computation rule that triggers a computation is required to insert said extra visual effect at said point.

4. The method as recited in claim 1, wherein said point is a transition between natural states of said application in said rendering pipeline.

5. The method as recited in claim 1, wherein said identifying includes detecting a transition between natural states of said application in said rendering pipeline using a transition rule of said state machine.

6. The method as recited in claim 1, wherein said inserting includes performing a computation that is required to insert said extra visual effect at said point using a computation rule of said state machine.

7. The method as recited in claim 1, wherein said extra visual effect is not built into said application.

8. A computer program product stored in a non-transitory computer readable medium that, when executed, causes a processor to insert an extra visual effect into a rendering pipeline of an application by:
   loading into a Graphics Processing Unit (GPU) driver a state machine that is customized for said application;
   identifying a point in said rendering pipeline to insert said extra visual effect using said state machine; and
   inserting said extra visual effect into said rendering pipeline at said point.

9. The computer program product as recited in claim 8, wherein said state machine includes a transition rule that detects a condition that causes a transition between natural states of said application in said rendering pipeline.

10. The computer program product as recited in claim 8, wherein said state machine includes a computation rule that triggers a computation required to insert said extra visual effect at said point.

11. The computer program product as recited in claim 8, wherein said point is a transition between natural states of said application in said rendering pipeline.

12. The computer program product as recited in claim 8, wherein said identifying includes detecting a transition between natural states of said application in said rendering pipeline using a transition rule of said state machine.

13. The computer program product as recited in claim 8, wherein said inserting includes performing a computation that is required to insert said extra visual effect at said point using a computation rule of said state machine.

14. The computer program product as recited in claim 8, wherein said extra visual effect is not built into said application.

15. A computing system for inserting an extra visual effect into a rendering pipeline of an application, comprising:
   a Graphics Processing Unit (GPU) including a processor and said rendering pipeline; and
   a driver that causes said processor to:
      load into said driver a state machine that is customized for said application;
      identify a point in said rendering pipeline to insert said extra visual effect using said state machine; and
      insert said extra visual effect into said rendering pipeline at said point.

16. The computing system as recited in claim 15, wherein said point is identified using a transition rule of said state machine that detects a condition that causes a transition between natural states of said application in said rendering pipeline.

17. The computing system as recited in claim 15, wherein said extra visual effect is inserted using a computation rule of said state machine that triggers a computation required to insert said extra visual effect at said point.

18. The computing system as recited in claim 15, wherein said point is a transition between natural states of said application in said rendering pipeline.

19. The computing system as recited in claim 15, wherein said extra visual effect is not built into said application.

20. The computing system as recited in claim 15, wherein said extra visual effect is a visual effect selected from the group consisting of:
   an added graphical content display in said application;
   a horizon-based ambient occlusion;
   an anti-aliasing;
   a tone mapping, and
   a High Dynamic Range (HDR) mapping.

* * * * *